United States Patent Office 2,773,847
Patented Dec. 11, 1956

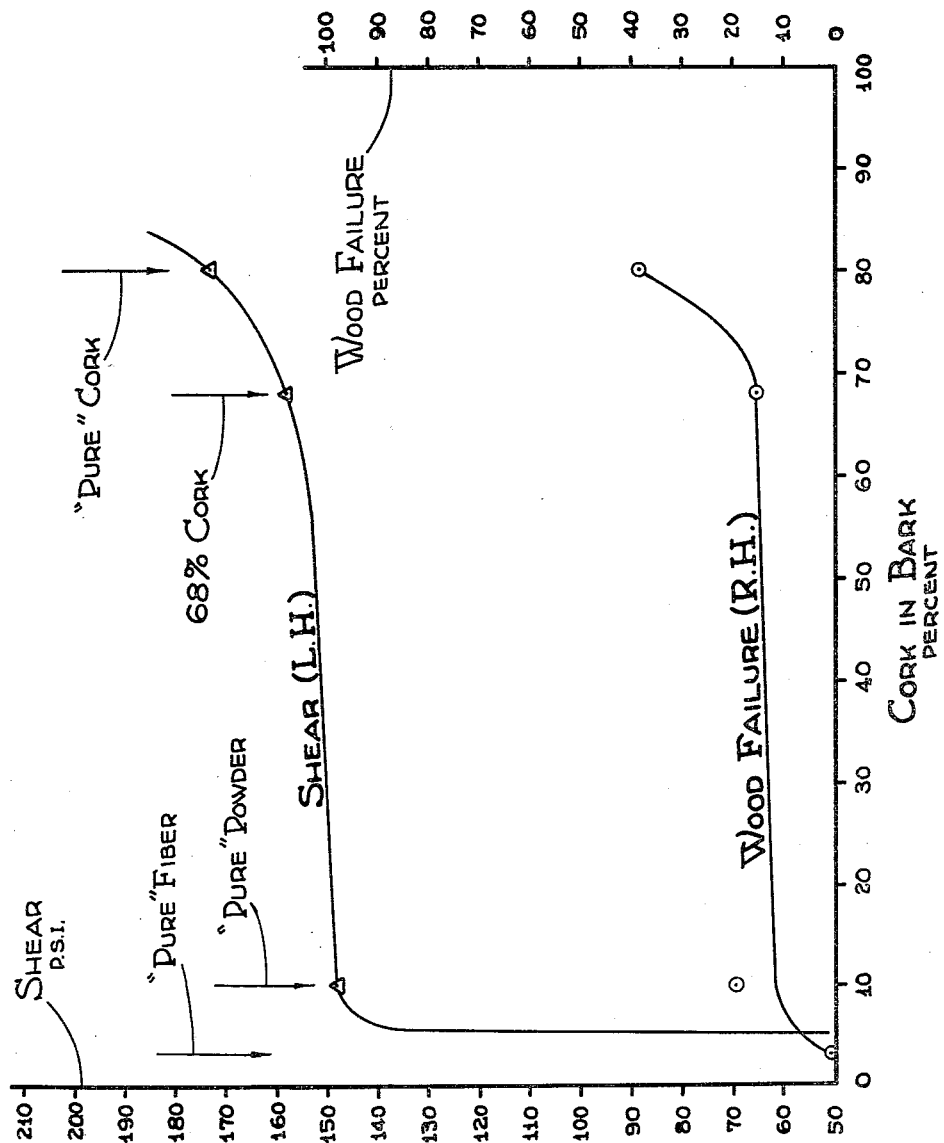

2,773,847
BARK COMPONENTS AS RESIN INGREDIENTS

Robert D. Pauley, Tacoma, Wash., assignor to Weyerhaeuser Timber Company, Tacoma, Wash., a corporation of Washington Application May 4, 1954, Serial No. 427,580

10 Claims. (Cl. 260—17.2)

This invention is concerned with the reaction of the cork and parenchyma components of the bark of coniferous trees with a basic acting alkaline compound to render the cork and parenchyma components reactive with an aldehyde to form a resin. It is the discovery of this invention that fractions of the bark of trees, containing the cork component in a proportion of at least about 68%, the remainder being parenchyma tissue or bark fiber or mixtures of both, may be activated by reaction with a soluble alkaline reacting compound and thereby be made reactable with aldehydes to produce a thermosetting resin which may be used in addition to phenolic compounds or to replace phenolic compounds in phenol-aldehyde type resins. Among such uses are the making of molded products, adhesive compositions and structural hardboards.

This application is a continuation in part of my copending application Serial No. 257,981, filed November 23, 1951, for Bark Components as Resin Ingredients, which was continued from application Serial No. 36,409, filed July 1, 1948, now abandoned.

It is an object of this invention to make a bark derived resin substitute for phenol-aldehyde resins, which resin has properties similar to phenol-aldehyde resins.

Various other and ancillary objects and advantages of the present invention will become apparent from the following description and explanation of the present invention.

Bark is not a homogeneous material, but is composed primarily of three different tissue components, to-wit: cork, sclerenchyma tissue in the form of either bast fibers or stone cells, and parenchyma tissue made up chiefly of sieve tubes but containing also food storage cells, companion cells, and connecting ray tissues. The term "non-fibrous phloem" used herein refers broadly to that portion of the whole bark from which a substantial portion of the cork and the sclerenchyma tissue has been removed. It, therefore, includes parenchyma tissue and may also include small proportions of the cork and fibers which are incidentally broken and finely comminuted to powder form during the differential pulverization of the bark.

The percentage composition of these three tissue components varies considerably with respect to the barks of different species of trees; with respect to the barks of different trees of the same species, depending on the age of the tree, geographical location, and other such factors; and even from different portions of the bole of the same tree. An indication of the variation in content of tissue components of different species of trees will be seen from inspection of Table I, below, showing a percentage analysis of three typical western coniferous trees, as follows: Douglas fir (*Pseudotsuga taxifolia*), Western hemlock (*Tsuga heterophyle*), white fir (*Abies concolor*).

TABLE I

| Botanical Constituents of Bark | Douglas Fir (Pseudotsuga taxifolia) | Western Hemlock (Tsuga heterophyle) | White Fir (Abies Concolor) |
|---|---|---|---|
|  | Percent | Percent | Percent |
| Cork | 25 | 5 | 40 |
| Phloem: |  |  |  |
|   A. Sclerenchyma— |  |  |  |
|     1. Fiber | 40 |  |  |
|     2. Stone Cells |  | 45 | 45 |
|   B. Parenchyma— |  |  |  |
|     1. Mostly sieve cells | 35 | 50 | 15 |

The analyses given in Table I, above, are but typical analyses and percentages of the components may vary greatly from one tree to another, or from one portion to another portion of the same tree. For instance, in a study made to determine the potential yield of Douglas fir cork, the bark from different trees or different portions of the same tree was segregated into four grades determined by the thickness of the cork layers, as follows: ¼ to ½ inch or more, ⅟₁₆ to ¼ inch, ⅟₃₂ to ⅟₁₆ inch, and less than ⅟₃₂ inch. The cork yield from the four grades, based on the averages of a large number of samples, was found to range from 45% to 20%. The grade 1 bark having cork layers of ¼ to ½ inch thickness was obtained mostly from the stumps of very old trees. The cork content in *Abies concolor* bark was found to vary from about 6% in the case of trees of 10 inches or less in diameter to approximately 50% in trees from 12 to 16 inches in diameter, and then to decrease to as low as 29% in trees from 16 to 46 inches in diameter.

The bark components in forms suitable for the practice of the instant invention are obtainable by methods which rely upon the selective comminution of the bark constituents followed by the application of mechanical methods for separating the products of various particle size. Such methods are represented by those disclosed in Letters Patent Nos. 2,437,672 (granted March 16, 1948, to Herman W. Anway, for Method of Treating Bark), 2,446,551 (granted August 19, 1948, to Robert D. Pauley, for Separation of Pure Bark Fiber From Finely Comminuted Bark) and 2,627,375 (granted February 3, 1953, to Bror L. Grondal and Calvin L. Dickinson, for Separation of Bark Components); said Letters Patent having a common assignee with this application. These methods are based upon the discovery that when the whole bark is subjected to a pulverizing operation at a controlled moisture content, the non-fibrous components of phloem are relatively friable as compared with the cork and bast fibers. The whole bark is, accordingly, subjected to one or more comminuting operations at a controlled moisture content whereby the non-fibrous phloem is reduced to a powder, the fiber bundles are opened up to release the individual fibers, but the relatively resistant aggregates of cork cells comprising the cork layers are not substantially reduced in size. There are thus produced three principal tissue components having different particle sizes, i. e., cork ultimate fiber, and powdered phloem. These may be separated by employing appropriate mechanical methods, such as screening, flotation, or air separation, but not without difficulty, and fractions designated as "pure" mean as pure as obtainable by such methods.

While the cork component obtained from the bark of coniferous trees resembles cork from the cork oak, it is quite different therefrom in chemical composition and in some physical properties. It has been established that the cork component from the bark of coniferous trees is highly thermoplastic, whereas the cork of the cork oak is not. Whereas temperatures of between about 450° F. and about 600° F. are employed in the commercial production of cork tile and cork board from Mediterranean cork, Douglas fir cork flows and becomes thermoplastic at temperatures slightly above 300° F. In fact, if it is heated to temperatures of the order of about 430° F., it chars and decomposes, providing further evidence of the fundamental distinction between these two products.

A significant difference between the cork of coniferous trees and Mediterranean cork is observed in their bulk densities. When samples of *Abies concolor*, Douglas fir and Mediterranean cork were milled to approximately 14 mesh size, the bulk density of *Abies concolor* was 15.3 pounds per cubic foot, of Douglas fir cork was 11.7 pounds per cubic foot, and of Mediterranean cork was 3.5 pounds per cubic foot. Mediterranean cork contains 20% to 30% lignin, whereas Douglas fir cork contains approximately 50% lignin as determined by the 72% sulfuric acid method. Mediterranean cork contains 25% to 40% fatty acids, whereas Douglas fir cork contains approximately 10% of these compounds. Mediterranean cork contains 3% to 6% tannins and phlobaphenes, whereas Douglas fir cork contains 15% to 20% of water soluble tannins. Other characteristics of Douglas fir cork are that it contains approximately 9% of wax; is approximately 65% soluble in 2% sodium hydroxide solution, approximately 22% soluble in ether; its aqueous suspension has a pH of 3.6; and it shows 30% absorptive reactivity with formaldehyde.

Various bark fractions have been employed in the practice of the instant invention. These were treated with an alkaline solution to render the cork and parenchyma components reactive with an aldehyde. The cork fractions so employed have ranged from substantially a "pure" cork fraction which, by the "Sink-Float" method, tests at about 80% cork with the remainder substantially evenly divided between fiber and parenchyma tissue to a mixture of bark components consisting of approximately 10% cork, 20% fiber and 70% parenchyma tissue.

"SINK-FLOAT" TEST

1. Fine grind the bark fraction in a micro-pulverizer through a 100 mesh screen to rub and abrade the bark components apart.
2. Prepare three volumetrically equal mixtures of carbon tetrachloride and benzene having densities of 1.380 g./ml., 1.450 g./ml. and 1.470 g./ml. respectively.
3. Mix by stirring until wet and then centrifuging an aliquot portion of the fine ground bark component product of step 1 into each of the solutions of step 2 in the ratio of 5 grams of bark component to 200 ml. of solution and allow to settle overnight.
4. Remove the "floats" very carefully by suction down to within one centimeter of the "sinks" layer and weigh the solids content of the "floats."
5. The cork is that component which floats on the 1.380 density test solution.

Since fiber sinks at 1.450 density and floats with the powder or parenchyma tissue at 1.470 density, the fiber content is the difference between the floats at 1.470 and 1.450.

The powder is the remainder after determining the cork and fiber content.

An adhesive composed of a bark fraction containing at least about 68% cork produced plywood which met interior grade specifications. Bark fractions comprising less than about 68% cork proved to be unsatisfactory as the principal ingredients in a caustic-formaldehyde bark adesive. Since the fiber is an inert material, its presence has no appreciable effect on the treatment of the cork and parenchyma components with an alkali, or the reaction of the reacted components with an aldehyde. When there is an appreciable amount of fiber present in the bark fraction, the fiber acts as an extender for the adhesive in the same manner as extenders commonly employed in such adhesives, the cork component and parenchyma tissue reacting with the alkali to form a reaction product which is reactive with the aldehyde. However, as appears hereafter, the resin produced from the parenchyma tissue is decidedly inferior to that produced from the cork.

In some of the experiments the formaldehyde was added as formalin. Commercial formalin contains by weight about 37% formaldehyde, about 7% methanol, from 0.005 to 1% of formic acid, with the remainder made up of water. If free alkali remains after the treatment of cork and powder it reacts with the formic acid.

No upper limit is placed on the size of the cork that can be treated with an alkaline solution as the size is not a critical factor. The cork is soluble in an alkaline solution. The sizes of the comminuted cork affect only the rate of solution and not the degree of solution. In most of the experiments the cork passed through a 65 mesh screen.

In this specification the reaction product of a mixture of cork, which may contain parenchyma tissue, and sodium hydroxide will be known as reactive cork. It will be understood that as used herein, the term "sodium hydroxide" is representative of any of the alkaline reacting compounds of the alkali metals. Reactive cork and reactive parenchyma react with an aldehyde, e. g., formaldehyde, decreasing the formaldehyde concentration and increasing the viscosity of the suspension. The reaction proceeds rapidly to form a resinous material which may be employed in the manufacture of adhesives suitable for use in the manufacture of plywood.

The formation of a resin by treating cork or a mixture of cork and parenchyma tissue with an alkaline solution to obtain reactive cork and/or reactive cork and parenchyma, and then treating the reaction product with an aldehyde, involves a large number of variables, such as the ratio of the cork to alkaline solution, the need for adding heat to the cork-alkaline mixture, the amount of aldehyde necessary to form a resin, the effect of wax-free cork on the resin, and the effect of adding a phenolic compound.

The treatment of the cork or mixture of cork and parenchyma with an alkaline compound to obtain reactive cork and reactive parenchyma is one of the most important steps in the process, in that if the cork and parenchyma are not rendered reactive with an aldehyde there will be no resin.

A comparison of Examples I, II and III shows that the alkaline material used can vary from about 15% to 25% of the weight of the cork. At the higher concentrations of alkaline material the cork-alkaline mixtures do not require the application of external heat to form a resin, but when a lesser amount (e. g., about 15%) of alkaline material is used external heat is required to make a resin having adhesive properties commensurate with those of a resin made with 20% or more or alkaline material. When substantially pure cork is treated with an alkaline solution the usage of alkaline material may be as much as 30%, for the reason that since cork reacts with the alkali, the greater amount of cork permits use of more alkali.

The ratio of aldehyde to cork or mixture of cork and parenchyma covers a wide range. Examples I, V and VI show that the percentage of formaldehyde can vary from approximately 20% to 75% of the weight of cork or a mixture of cork and parenchyma.

The addition of a phenolic compound to the reactive cork was investigated, and in Examples VIII, IX and X phenol, cresol, and xylenol, respectively, were added to the reactive cork. On comparison of Examples I, VIII, IX and X it is seen that the addition of a phenolic compound to the reactive cork produces a much superior resin than does cork alone.

Following Examples I through VII illustrate the effect of the different concentrations of alkaline solutions on cork as reflected in the manufacture of plywood adhesives, and also the effect of the variation of aldehyde. In Example VII the wax was first extracted from the cork. These results are summarized in following Table II.

TABLE II

| Example | Components | Parts | Grade Plywood |
|---|---|---|---|
| I | Cork | 100 | Interior. |
|   | NaOH | 25 |   |
|   | Paraformaldehyde | 47 |   |
| II | Cork | 100 | Do. |
|   | NaOH | 20 |   |
|   | Formaldehyde (Formalin) | 43 |   |
| III | Cork | 100 | Do. |
|   | NaOH | 15 |   |
|   | Formaldehyde (Formalin) | 43 |   |
| IV | Cork | 100 | Do. |
|   | NaOH | 25 |   |
|   | Formaldehyde (Formalin) | 47 |   |
| V | Cork | 100 | Do. |
|   | NaOH | 25 |   |
|   | Paraformaldehyde | 23 |   |
| VI | Cork | 100 | Interior to Concrete. |
|   | NaOH | 25 |   |
|   | Paraformaldehyde | 70 |   |
| VII | Cork | 100 | Concrete. |
|   | NaOH | 25 |   |
|   | Paraformaldehyde | 47 |   |

*Example I*

In this experiment the sodium hydroxide was 25% by weight, based on the weight of the bark fraction comprising 68% cork. The sodium hydroxide was dissolved in about 140 parts of water and about 100 parts of the bark fraction added to the hot alkaline solution, and mixed until the heat of reaction had been dissipated. Approximately 47 parts of paraformaldehyde in about 30 parts of water were mixed in the alkaline solution containing reactive cork until a smooth mixture was obtained. Sample ⅜" plywood panels of ⅛" Douglas fir veneer were made with the resin and at an average dry shear of 173 pounds per square inch the average wood failure was 77%, with the plywood passing the two cycle soak test prescribed by the D. F. P. A. for interior grade plywood.

*Example II*

In this experiment the sodium hydroxide was 20% by weight, based on the weight of the bark fraction comprising 68% cork, 20 parts of sodium hydroxide were dissolved in about 140 parts of water and the bark fraction added to the hot alkaline solution and mixed until the heat of reaction had been dissipated. Approximately 117 parts of formalin (about 43% formaldehyde based on the weight of the bark fraction) were mixed in the alkali-cork dispersion containing reactive cork until a smooth mixture resulted. Sample ⅜" plywood panels of ⅛" Douglas fir veneer were made and evaluated at 45 lb./M d. g. l. and 55 lb./M d. g. l. The term lb./M d. g. l. means pounds of glue per thousand square feet of double glue line, or pounds of glue per two thousand square feet of area between the veneers. At both 45 lb. and 55 lb. spreads the plywood passed the two cycle soak test prescribed for interior grade glue.

*Example III*

In this experiment the sodium hydroxide was 15% by weight based on the weight of the bark fraction (68% cork). 15 parts of sodium hydroxide were dissolved in about 140 parts of water and the bark fraction added. Instead of allowing the resulting mixture to cool, the alkali-bark mix was placed in a water bath at 200° F. for approximately 30 minutes. About 117 parts of formalin (43% formaldehyde based on the weight of the bark) were mixed in the cool alkali-bark dispersion containing reactive cork until a smooth mixture resulted. Sample ⅜" plywood panels of ⅛" Douglas fir veneers were made and evaluated at 45 lb./M d. g. l. and 55 lb./M d. g. l., and in each instance an interior grade plywood was produced.

Examples I, II and III show that by heating the mixture of cork and an alkaline solution a less concentrated alkaline solution will produce a reaction product that is nearly equal to the product obtained when the cork is treated with a more concentrated alkaline solution and no external heat added.

The concentration of formaldehyde was varied over a wide percentage range based on the ratio of formaldehyde to bark fraction, with the results indicating that comparable resins were obtained. The following examples illustrate the variation of formaldehyde concentration. In Example I the formaldehyde was about 47% by weight based on the weight of the bark fraction, and was added in the form of paraformaldehyde. In Example IV formaldehyde was added as formalin.

*Example IV*

In this example the sodium hydroxide was 25% by weight based on the weight of the bark (68% cork). 25 parts of sodium hydroxide were dissolved in about 140 parts of water and the bark fraction added to the hot alkaline solution and mixed until the heat of reaction had been dissipated. Approximately 127 parts of formalin (about 47% formaldehyde based on the weight of the bark fraction) were added to the alkali-bark dispersion containing reactive cork until a smooth mixture resulted. Sample ⅜" plywood panels of ⅛" Douglas fir veneer were made with the resin at a usage of 45 lb./M d. g. l., resulting in an interior grade plywood.

*Example V*

In this example the ratio of formaldehyde to bark fraction was lowered to about 23% formaldehyde based on the weight of the bark fraction. 25 parts of sodium hydroxide were dissolved in about 140 parts of water and about 100 parts of bark fraction (68% cork) added to the hot alkaline solution and mixed until the heat of reaction had been dissipated. Approximately 23 parts of paraformaldehyde (about 23% formaldehyde based on the weight of the bark) in about 30 parts of water were mixed in the alkali-bark dispersion containing reactive cork until a smooth mixture was obtained. Sample ⅜" plywood panels of ⅛" Douglas fir were made with the resin at a usage of 45 lb./M. d. g. l. resulting in an interior grade plywood.

*Example VI*

In this example the ratio of formaldehyde to bark fraction was raised to about 70% formaldehyde based on the weight of the bark. 25 parts of sodium hydroxide were dissolved in about 140 parts of water and about 100 parts of bark fraction (68% cork) added to the hot alkaline solution and mixed until the heat of reaction had been dissipated. Approximately 70 parts of paraformaldehyde (about 70% formaldehyde based on the weight of the bark fraction) in about 30 parts of water were mixed in the alkali-bark dispersion containing reactive cork until a smooth mixture was obtained. Sample ⅜" plywood panels of ⅛" Douglas fir veneer were made with this resin at a usage of 45 lb./M. d. g. l., resulting in a plywood of almost concrete form quality.

The barks of coniferous trees contain various waxes and experiments were conducted to determine the effect on the resin by extracting the cork with benzene before adding the cork to the alkaline solution. The following Example VII illustrates this effect on the resulting resin.

*Example VII*

The cork from coniferous tree bark was extracted with benzene to remove various waxes. 25 parts of sodium hydroxide were dissolved in about 140 parts of water and about 100 parts of extracted cork added to the hot alkaline solution and mixed until the heat of reaction had been dissipated. Approximately 47 parts of paraformaldehyde in about 30 parts of water were added by stirring to the alkali-cork reaction product until a smooth mixture was obtained. Sample ⅜" plywood panels of ⅛" Douglas fir veneer were made with the resin at a usage of 45 lb./M. d. g. l., resulting in a concrete form plywood.

Example VII shows that extracted cork produces a resin superior to resins made from cork which is not wax free. The resins formed in Examples I and IV when used as a plywood glue gave an interior grade plywood, while the resin in Example VII gave a concrete form plywood, a better grade. The extraction of cork with benzene to remove the waxes results in a better resin and the waxes can be recovered.

At the present time it is believed that the cork and parenchyma components contain phenolic-like structures. These phenolic-like structures, upon treatment with an alkaline solution, are rendered reactive with aldehydes to form resins. Examples I–VI illustrate compositions having properties similar to phenol-aldehyde resins.

In the following experiments, VIII, IX and X, a phenolic compound from the group consisting of phenol, xylenol, and cresol was added to the alkaline dispersion containing reactive cork to determine the effect on the resin produced. The ratio of alkaline compound to the bark fraction, 25% of alkaline compound based on the weight of the bark fraction, and the ratio of formaldehyde, 47% by weight based on the weight of the bark fraction, were maintained constant while only the usage of phenolic compound was varied.

The addition of approximately 20% by weight of a phenolic compound based on the weight of the bark fraction makes a superior resin to that formed by cork alone. Wax-free cork can be used to make a resin with about the same adhesive properties as can be made with unextracted cork plus either phenol or cresol. 3,5-xylenol, when added to reactive unextracted cork, produces an adhesive superior to an adhesive formed from wax-free cork, or when phenol and cresol are added to the reactive cork.

Following Table III illustrates the effect of the addition of a phenolic-like compound to the resin:

TABLE III

| Example | Components | Parts | Grade Plywood |
|---|---|---|---|
| VIII | Cork | 100 | Concrete |
| | NaOH | 25 | |
| | Paraformaldehyde | 47 | |
| | Phenol | 20 | |
| IX | Cork | 100 | Do. |
| | NaOH | 25 | |
| | Paraformaldehyde | 47 | |
| | Cresol | 20 | |
| X | Cork | 100 | Exterior |
| | NaOH | 25 | |
| | Paraformaldehyde | 47 | |
| | Xylenol | 20 | |

*Example VIII*

25 parts of sodium hydroxide were dissolved in about 140 parts of water, and about 100 parts of the bark fraction were added by stirring to the hot alkaline solution until the heat of reaction had been dissipated. 20 parts of phenol and approximately 47 parts of paraformaldehyde in about 30 parts of water were added by stirring. Sample ⅜" plywood panels of ⅛" Douglas fir veneer were made with this resin at a usage of 45 lb./M. d. g. l., resulting in a concrete form plywood.

*Example X*

Approximately 25 parts of sodium hydroxide were dissolved in about 140 parts of water and about 100 parts of bark fraction comprising 68% cork were added by stirring to the hot alkaline solution until the heat of reaction had been dissipated. 20 parts of 3,5-xylenol and approximately 47 parts of paraformaldehyde in about 30 parts of water were added by stirring. Sample ⅜" plywood panels of ⅛" Douglas fir veneer were made with this resin at a usage of 45 lb./M. d. g. l., resulting in exterior grade plywood.

Example XI illustrates the use of a bark fraction in which the cork constitutes approximately 80% of the bark. Example XII illustrates the use of a bark fraction comprising approximately 70% parenchyma tissue, and shows a formulation having the largest amount of parenchyma tissue and the smallest amount of cork.

*Example XI*

About 27 parts of sodium hydroxide were added to about 152 parts of water and 100 parts of a bark fraction comprising approximately 80% cork (by the "sink-float" test; formerly estimated at 98% by visual methods) were stirred into the hot alkaline solution until the heat of reaction had been dissipated. About 109 parts of formalin (40% formaldehyde by weight based on the weight of the cork) were mixed in the alkali-cork dispersion. The resin was tested as a plywood adhesive. The usage was varied from about 44 lb./M d. g. l. to 60 lb./M d. g. l. and the resulting plywood passed the 10 cycle soak test for an interior grade plywood.

*Example XII*

About 27 parts of sodium hydroxide were dissolved in approximately 152 parts of water and 100 parts of a bark fraction containing approximately 70% parenchyma tissue powder, 20% fiber and 10% cork (formerly estimated as 91% powder, 1% fiber and 8% cork), stirred into the hot alkaline solution until the heat of reaction had been dissipated. About 109 parts of formalin (40% formaldehyde by weight based on the weight of the bark fraction) were mixed in the powder-alkali dispersion. The resin was tested as a plywood adhesive. The results of these tests indicated that a resin had been prepared but that its adhesive properties were unsatisfactory and decidedly inferior to those of a resin prepared from a bark fraction having a cork content of at least 68%.

Sodium hydroxide has been used in the examples as the basic reacting alkali metal compound for reaction with the bark fraction. Other basic reacting alkali metal and ammonium compounds may be substituted for the sodium hydroxide in equivalent amounts. Examples of such other compounds are sodium carbonate, potassium hydroxide, potassium carbonate and ammonium hydroxide.

Plywood tests for wet shear (WS) and wet wood failure (WF) have been made comparing these properties of adhesive resins made in accordance with the process of these examples using (1) the bark fraction commercially known as "Silvacon 383," containing about 68% cork, (2) "pure" bark fiber containing about 3% cork, (3) "pure" bark powder containing about 70% parenchyma tissue powder, 20% fiber and 10% cork and (4) "pure" cork containing about 80% cork. In each case the plywood used for testing was 3-ply ⅜" DF plywood made in the same manner and under the same conditions. The adhesive composition used in making the test plywood was prepared from the following formulation differing only in the bark fraction used:

TEST COMPOSITION 500 gms. (O. D.) of bark fraction
125 gms. NaOH
585 ml. Formalin (40% formaldehyde)
600+ gms. H₂O to spreading viscosity The results of tests for wet shear and wet wood failure on each type of bark fraction are tabulated in the following table and plotted on the graph comprising the accompanying drawing.

TABLE IV

| Bark Fraction Used in the Adhesive | Wet Shear, p. s. i. | Wet Wood Failure, percent |
|---|---|---|
| (1) "Silvacon 383" (About 68% cork) | 158 | 16.0 |
| (2) "Pure" bark fiber (About 3% cork) | 0 | 0 |
| (3) "Pure" bark powder ("Silvacon 490", About 70% parenchyma, 20% fiber and 10% cork) | 148 | 19.5 |
| (4) "Pure" cork (About 80% cork) | 173 | 41.0 |

In the graph the percentage of cork in the bark component is plotted against the results of the wet shear test in pounds per square inch in the lefthand (L. H.) ordinate and against percent wet wood failure in the righthand (R. H.) ordinate. In this latter test, the sample which has been subjected to the wet shear test is observed for determination of the proportion of the shear rupture that is attributable to the wood. The observations are visual and subject to personal inaccuracies. However, the test does provide a supplemental indication of the comparative quality of the adhesive as expressed in the estimated percent of wood failure. It will be noted by reference to the graph that the point for the wood failure representing "Pure bark powder" (No. 3 of the table) is off the curve. However, the mean curve through the four points has approximately the same characteristics as the wet shear curve which latter is based upon actual readings. Both of these curves show a more marked improvement in the properties of the adhesives in the region of the cork percentages above about 68% than those below that point.

Having now described my invention and the manner in which it may be used, what I claim as new and desire to protect by Letters Patent is:

1. A process for making a resin comprising dissolving a basic reacting compound in water, adding a bark component separated from the bark of a coniferous tree and containing at least about 68% of cork, stirring the mixture until the heat of reaction is dissipated and the bark component is dispersed and dissolved, adding while stirring an aqueous solution of an aldehyde selected from the group consisting of formaldehyde and paraformaldehyde, and reacting the mixture to produce a resin.

2. A process for making a resin comprising adding to an aqueous solution of a basic reacting compound of an alkali metal a comminuted bark component separated from the bark of a coniferous tree and containing at least about 68% of cork, stirring the mixture until the heat of reaction is dissipated and the bark component is dispersed and dissolved, adding formaldehyde to the reaction mixture and reacting the resulting mixture to produce a resin.

3. A process for making a resin comprising dissolving a basic reacting compound in an alkali metal in from about 130 to about 150 parts of water, adding to the resulting solution about 100 parts of a bark component separated from the bark of a coniferous tree and containing at least about 68% of cork, stirring the mixture until the heat of reaction is dissipated and the bark component is dispersed and dissolved, adding while stirring a solution of from 20-70 parts of formaldehyde in from 30-90 parts of water and reacting the mixture to produce a resin.

4. A process for making a resin comprising dissolving from 10-40 parts of a basic reacting compound of an alkali metal in from about 130 to about 150 parts of water, adding about 100 parts of a bark component separated from the bark of a coniferous tree and containing at least about 68% of cork, heating while stirring the resulting mixture to a temperature within the range of from about 150° F. to about 200° F. to disperse and dissolve the bark component, adding to the resulting reaction mixture from 20-70 parts of formaldehyde in from 30-90 parts of water and reacting the mixture to produce a resin.

5. A process for making a resin comprising dissolving a basic reacting compound in water, adding a bark component separated from the bark of a coniferous tree and containing at least about 68% of cork, stirring the mixture until the heat of reaction is dissipated and the bark component is dispersed and dissolved, adding to the reaction mixture a phenolic compound selected from the group consisting of phenol, cresol and xylenol, adding an aldehyde selected from the group consisting of formaldehyde and paraformaldehyde, and reacting the resulting mixture to produce a resin.

6. A process for making a resin comprising dissolving from 10-40 parts of a basic reacting compound in water, adding about 100 parts of a bark component separated from the bark of a coniferous tree and containing at least about 68% of cork, stirring the mixture until the heat of reaction is dissipated and the bark component is dispersed and dissolved, adding to the reaction mixture up to 30 parts of a phenolic compound selected from the group consisting of phenol, cresol and xylenol, adding while stirring from about 20-70 parts of formaldehyde and reacting the resulting mixture to produce a resin.

7. A resin product consisting of the reaction product of an aldehyde selected from the group consisting of formaldehyde and paraformaldehyde and a component of the bark of a coniferous tree consisting of at least about 68% of cork, said component having been rendered reactive with aldehydes by treating it with a solution of a basic reacting compound and said resin product having been produced in accordance with the process of claim 1.

8. A resin product consisting of the reaction product of formaldehyde and a component of the bark of a coniferous tree consisting of at least about 68% of cork, said component having been rendered reactive with aldehydes by treating it with a solution of a basic reacting alkali metal compound and said resin product having been produced in accordance with the process of claim 2.

9. A process for making a resin comprising adding to an aqueous solution of a basic acting compound of an alkali metal wax free cork obtained as a product separated from the barks of coniferous trees and having its wax content extracted therefrom, stirring said mixture until the heat of reaction is dissipated and the bark component is dispersed and dissolved, adding formaldehyde in water and reacting the mixture to make a resin.

10. A process for making a resin comprising adding to an aqueous solution of a basic acting compound of an alkali metal a benzene extracted wax free cork obtained as a product separated from the barks of coniferous trees, stirring said mixture to disperse and dissolve the bark component and simultaneously cooling the same, thereupon adding formaldehyde to the alkali-cork reaction product and reacting the mixture to make a resin.

References Cited in the file of this patent

UNITED STATES PATENTS

| 1,455,762 | Howard | May 15, 1923 |
| 2,128,894 | Bond | Sept. 6, 1938 |